W. O. WILLE.
LATHE TOOL HOLDER.
APPLICATION FILED FEB. 19, 1921.
1,420,171.
Patented June 20, 1922.
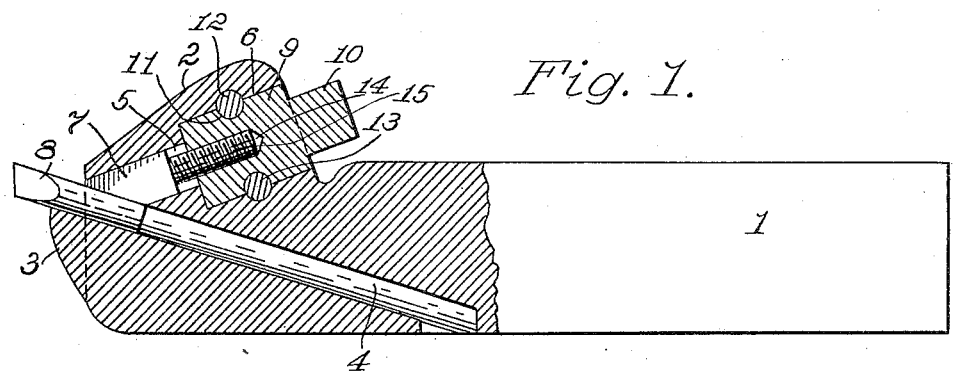
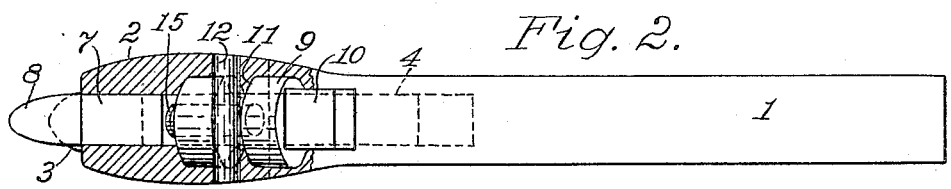
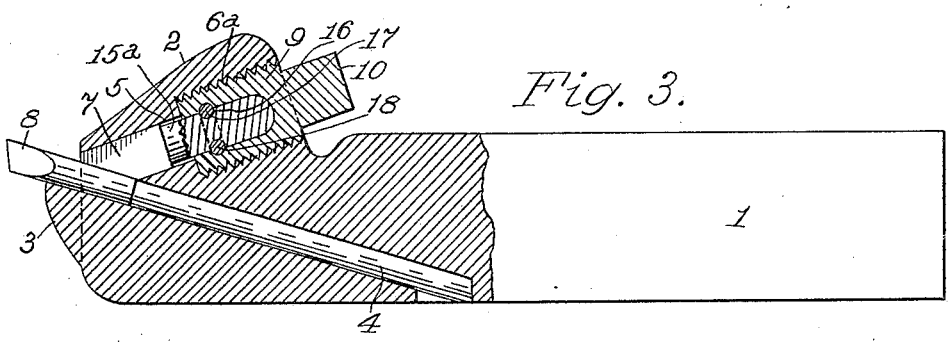
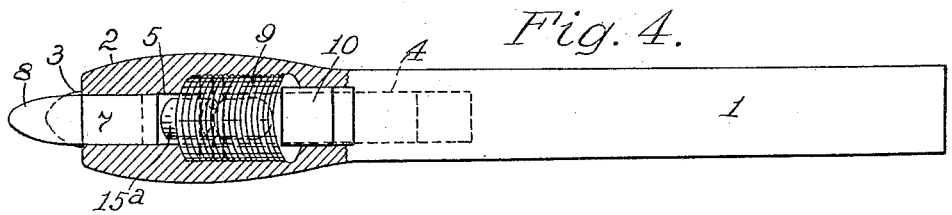
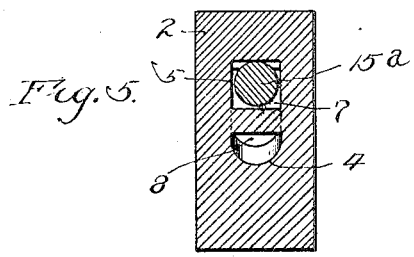
Inventor,
Walter O. Wille, by
G. C. Kennedy,
Attorney.

UNITED STATES PATENT OFFICE.

WALTER O. WILLE, OF WATERLOO, IOWA.

LATHE-TOOL HOLDER.

1,420,171. Specification of Letters Patent. Patented June 20, 1922.

Application filed February 19, 1921. Serial No. 446,378.

*To all whom it may concern:*

Be it known that I, WALTER O. WILLE, a citizen of the United States of America, and a resident of Waterloo, Blackhawk County, Iowa, have invented certain new and useful Improvements in Lathe-Tool Holders, of which the following is a specification.

My invention relates to improvements in lathe-tool holders, and the object of my improvement is to provide in such a holder quickly operable and adjustable means for securely clamping a lathe-tool in the holder in an adjusted position, such means being also quickly releasable.

This object I have accomplished by the means which are hereinafter described and claimed, and which are illustrated in the accompanying drawings, in which Fig. 1 is a view, partly in side elevation and partly in medial longitudinal vertical section, of my improved holder, and Fig. 2 is a view, partly in plan and partly in section of the parts shown in said Fig. 1. Figs. 3 and 4 are similar views respectively to said Figs. 1 and 2, but showing a slightly modified form of the adjustable clamping means. Fig. 5 is a cross-section of the working-head of the holder looking forwardly.

Similar numerals of reference denote corresponding parts throughout the several views.

The device of this invention is especially designed for use in supporting and adjustably holding a lathe-tool, for the conditions attending the operations of a lathe upon a highly resistant material, such as specially hardened and alloyed steel, are such that not only the tool but the holder therefor are subjected to great strains which are of a nature to fracture or quickly wear out a holder which is not capable of proper resistance.

Experience has demonstrated that the shank 1 of such a holder should be of maximum strength to prevent collapse, and especially, should not be bodily hollowed, longitudinally bored, or otherwise weakened at nodal or bearing points, or at locations where the shank is clamped in a slide-rack or other support. In my device, therefore, the shank 1 is a solid block of steel and not weakened in any way by reason of its form, its forward end being shaped to be laterally widened at 2 providing a working-head whose upper part 2 is offset upwardly. An inclined longitudinal tool-seat bore 4 is provided in said head opening in the front working face of the latter, while its rear end need extend but a short distance into said shank and not enough to weaken same at the location where it is held in the slide-rest. 3 is a forwardly directed prow or projection extending from the front working face of the head, with its upper surface alined with the bottom surface of the bore 4 to support the working end of the tool 8 near its point when said tool is mounted in said bore. Said head 2 is provided with another bore which extends from the middle of the rear offset face of said head longitudinally forwardly, inclined downwardly to meet the bore 4 at a common opening in the front working face of said head, convergently. The forward portion 5 of the second-mentioned bore is preferably square or non-circular in cross-section to seat a wedge-block 7 which is thus non-rotatable therein, and whose beveled face may engage the abutting face of the tool 8 thereunder. This also locks said tool to prevent its turning in the bore 4, and facilitates mounting of the tool and the adjusting of the clamping-block 7. The rear part of the second-mentioned bore is cylindrical and of greater diameter than the bore part 5 to seat the rock-body 9 which has a rearwardly projecting squared boss 10 to be received by a wrench. The cylindrical outer surface of the body 9 has a medial annular groove 11, the head 2 having two cylindrical transverse holes to seat removable pins 12 and 13 which also traverse and loosely fit opposite parts of said groove 11, thus locking the body 9 in the bore part 6 while permitting it to be rotated. Said body 9 has an interiorly-threaded axial bore 14 extending partly through it from its front face to receive the threaded stem 15 projecting rearwardly from the clamping-block 7. By this means, when all said parts are in place, and the body 9 is turned in one direction, the clamping-block 7 is forced into compressive engagement with the tool 8 near the working end of the latter. It will be seen that because of the convergency of the bores 4, and 5—6, the tool 8 is held in its seat and upon the supporting projection 3 with a maximum effect and as near as possible to its working edge. Because of this arrangement, the shortest possible remnant of the tool can be used, preventing wastage. The movable parts are completely encased in the head except the boss 10 which is out of the way.

In the modification illustrated in Figs. 3 and 4, the body 9 is threaded exteriorly to fit the interiorly threaded bore-part 6ª, while the stem 15ª of the clamping-block 7 is not threaded but is merely provided with an annular channel or groove 16, the body 9 having two transverse holes to receive pins 17 and 18 to secure the body 9 on said stem while permitting its rotation. This form of adjusting-means is actuated in the same way as the one previously described to engage or release the clamping-block 7 by merely turning the boss 10, using a wrench.

Having described my invention, what I claim as new, and desire to secure by Letters Patent, is:

1. A lathe-tool holder, comprising in combination, a shank having a head with part thereof upwardly offset, said head having bores positioned in V-shape to converge approximately at the working face of the head, with one bore opening at its opposite end at the offset part of said head, the other bore receiving a lathe-tool to project from said head, and an adjustable clamping-element movably mounted in said first-mentioned bore to compressively engage said tool while positioned at less than a right angle thereto in the second-mentioned bore.

2. A lathe-tool holder, comprising in combination, a shank having an upwardly offset head, said head having tool-seating and clamp-element receiving bores meeting angularly near the working face of said head, the clamp-element receiving bore having its other end opening in the offset face of said head, a wedge-shaped clamping-element seated and longitudinally movable in said clamping-element receiving bore to engage a tool in said tool-seating bore at less than a right angle, and adjustable compression-means in said clamping element receiving bore operable to engage and compress said clamping-element against said tool adjustably.

3. A lathe-tool holder, comprising in combination, a shank having an upwardly offset head, said head having tool-seating and clamp-element receiving bores meeting angularly near the working face of the head, the clamp-element receiving bore being enlarged at its rear end opening in the offset face of said head, a clamping-element seated slidably in the forward smaller part of the latter bore to engage a tool in the tool-seating bore, and a compression device rotatably mounted in the larger part of said clamp-element receiving bore operable to propel and adjustably compress said clamping-element against said tool.

4. A lathe-tool holder, comprising in combination, a rigid body having tool-seating and clamp-element receiving bores, meeting convergently near the working end of the body, the forward part of the clamp-element receiving bore adjacent the tool-seating bore being of non-circular shape, a non-rotatable clamping-element mounted for longitudinal adjustment in the non-circular part of said bore to bear against a tool seated in the tool-seating bore, and an adjustable device mounted in the rear part of said clamp-element receiving bore to adjustably compress said clamping-element upon said tool.

5. A lathe-tool holder, comprising in combination, a rigid body having tool-seating and clamp-device receiving bores meeting convergently near the working end of said body, said body having a projection on its working end whose upper surface is continuous in the same line as the lower face of the tool-seating bore to underlie and support the projecting working end of a lathe-tool mounted in the latter bore, a clamping-device mounted for longitudinal adjustment in said clamp-device bore whose longitudinal axis extended traverses the tool in the tool-seating bore and the said body projection angularly to lock the tool between said device and said projection at the meeting place of said bores.

6. A lathe-tool holder, comprising in combination, a shank having a working head offset upwardly forwardly obliquely, a clamp-receiving bore extending from the offset face of said head slopingly downwardly to the forward face thereof and having its rear part cylindrically widened its narrower forward part being non-circular, said head having a tool-seating bore, the said bores converging and having a common opening at the forward face of said head, a non-rotatable clamping wedge mounted in the non-circular part of said clamp-receiving bore, and a rotatable device mounted in the larger cylindrical part of the latter bore and adapted to adjustably clamp said wedge against a tool in said tool-seating bore.

Signed at Waterloo, Iowa, this 20th day of Jan., 1921.

WALTER O. WILLE.